J. D. CAMPBELL & A. J. MARTIN.
VEHICLE WHEEL.
APPLICATION FILED APR. 18, 1913.
1,085,723.
Patented Feb. 3, 1914.
2 SHEETS—SHEET 1.
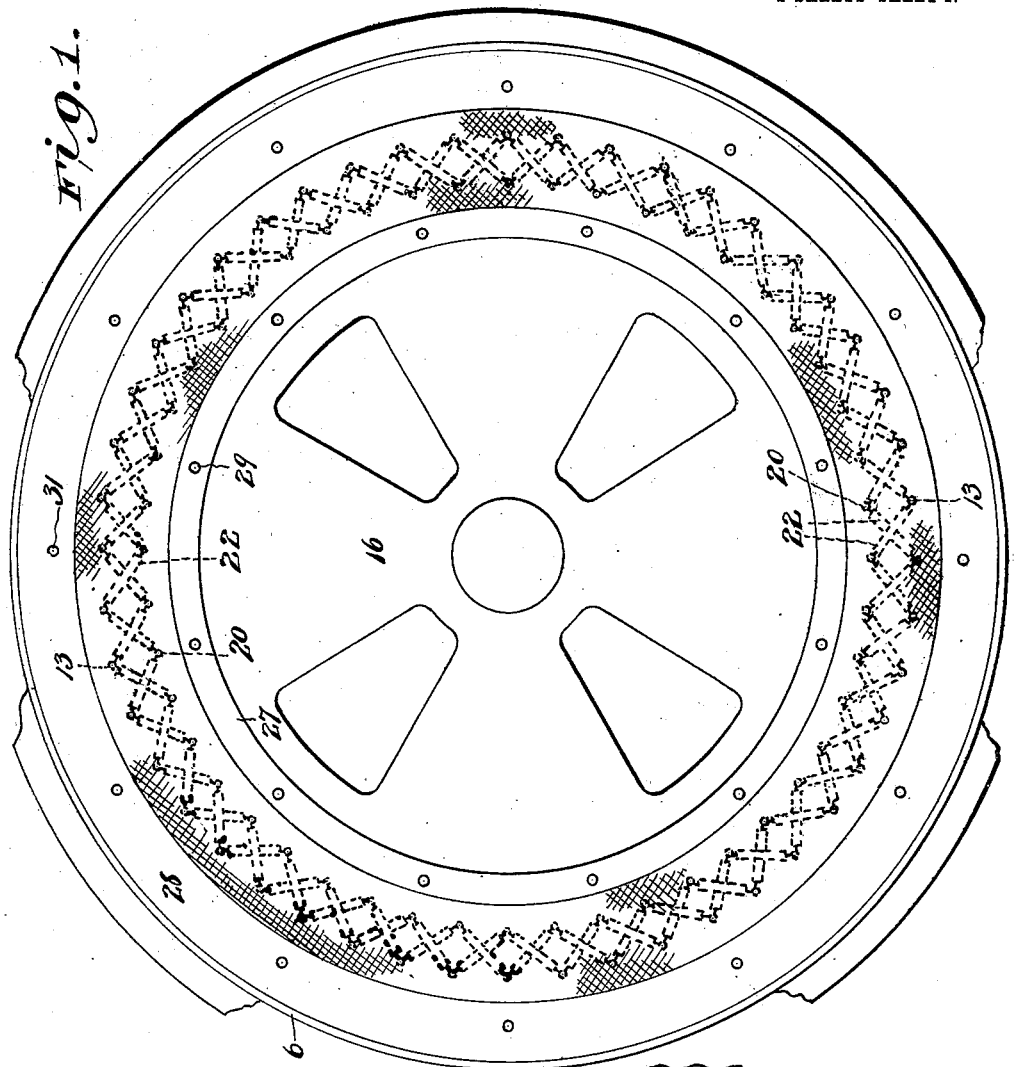
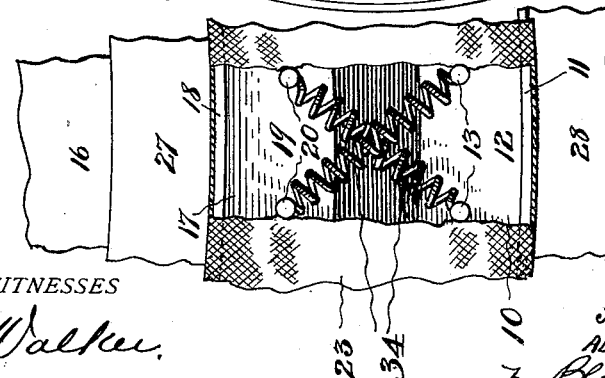
WITNESSES
INVENTORS,
JOHN D. CAMPBELL
ADOLPHUS J. MARTIN
by Blackwood Bros.
Attorneys.

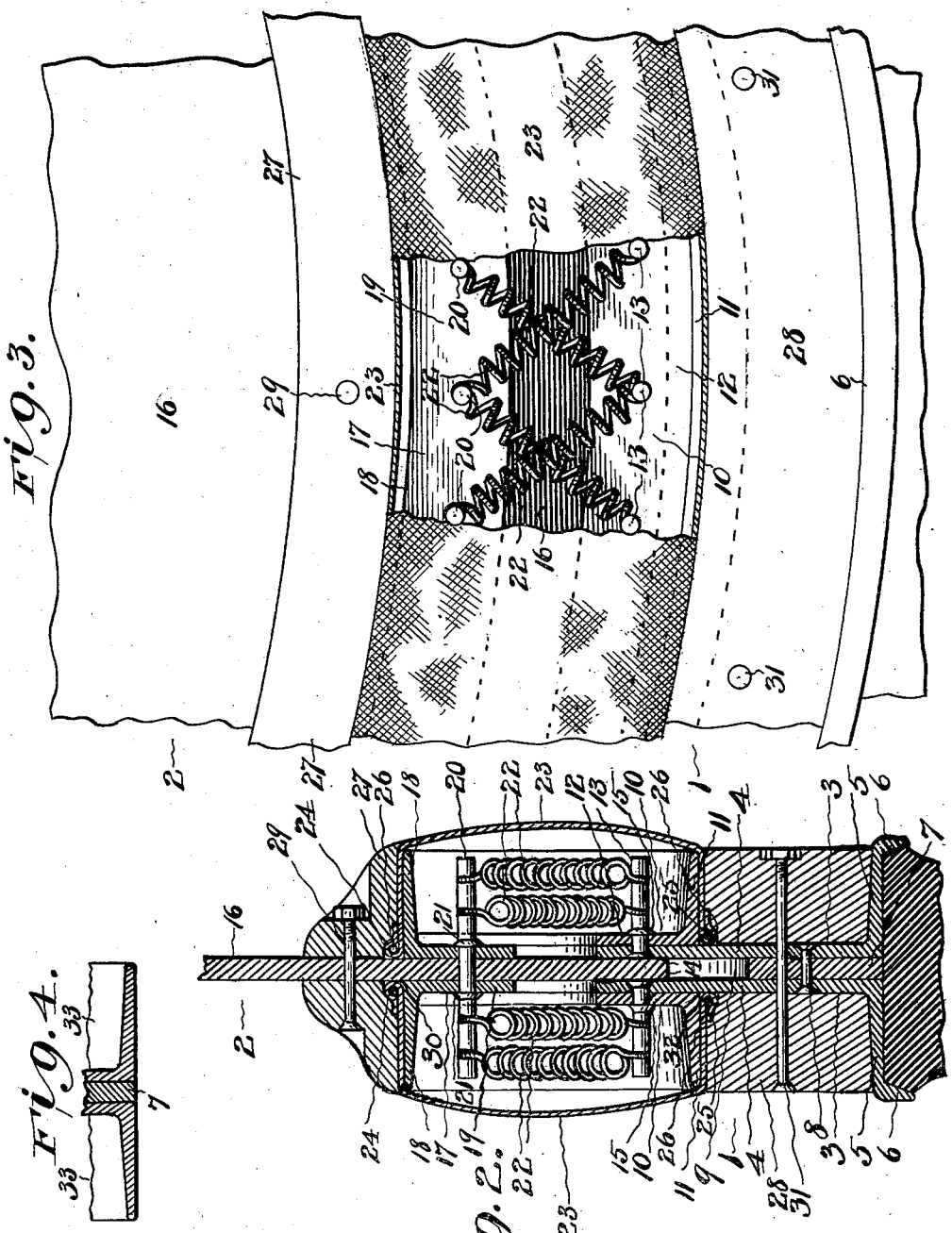

UNITED STATES PATENT OFFICE.

JOHN D. CAMPBELL, OF NEWARK, AND ADOLPHUS J. MARTIN, OF PASSAIC, NEW JERSEY.

VEHICLE-WHEEL.

1,085,723.      Specification of Letters Patent.      Patented Feb. 3, 1914.

Application filed April 18, 1913. Serial No. 762,059.

*To all whom it may concern:*

Be it known that we, JOHN D. CAMPBELL and ADOLPHUS J. MARTIN, citizens of the United States, residing, respectively, at Newark, in the county of Essex and State of New Jersey, and at Passaic, in the county of Passaic and State of New Jersey, have invented certain new and useful Improvements in Vehicle-Wheels, of which the following is a specification.

Our invention relates to vehicle wheels, particularly to motor vehicle wheels.

It has for an object to provide a wheel, of this character, which obviates the necessity for the employment of pneumatic, cushion or resilient tires, by serving all the purposes of wheels applied with such tires and additional advantageous purposes.

It has for another object to provide a wheel, of this character, having means whereby when employed as the driving wheel of a motor vehicle the power will be gradually applied thereto in either direction, thus reducing the strain upon the driving shaft and the driving wheel and reducing the jar to vehicles incident to starting in either direction or stopping.

It has for another object to provide a wheel, of this character, having means whereby its working parts are protected from injurious matter, such as dirt, stones and water and yet allow of easy access for inspection or repair.

It has for another object to provide a wheel, of this character, having means whereby the parts thereof which are to be subjected to the greatest strain are braced, thus making the wheel strong and rigid.

In the drawings: Figure 1 is a side view of our invention. Fig. 2 a fragmentary transverse sectional view. Fig. 3 a fragmentary side view. Fig. 4 a detail sectional view of a modified form of our invention, showing the felly without tire retaining figures in that normally closed spiral springs view of a modified form of our invention, showing normally closed spiral springs applied under tension. Figs. 2 to 5 inclusive are on an enlarged scale.

Referring to the drawings in which like reference characters designate corresponding parts, 1 designates the felly member and 2 the hub member of the wheel.

The felly member 1 consists of angular metal rings 3 having inwardly extending portions 4 and laterally extending portions 5 provided with flanges 6 retaining a tire on the wheel. The portions 4 are spaced apart by a metal ring 7 interposed between them and secured by a series of rivets 8, the outer periphery of the ring 7 coming flush with the outer faces of the portions 5 and its inner periphery extending short of the inner peripheries of the portions 4 and leaving a circular groove 9. Angular metal rings 10 having laterally extending portions 11, spaced from the portions 5, and inwardly extending portions 12 are secured to the portions 4 by a series of pins 13 the inner ends of which pass through the portions 4 and 12 of the rings 3 and 10 respectively and are provided with heads 14 and flanges 15, the heads being flush with the inner faces of the portions 4.

The hub member 2 consists of a circular metal disk 16 the edge of which extends into the groove 9 short of the outer periphery of the ring 7 and is adapted to slide and rotate therein. Angular metal rings 17 having laterally extending portions 18, spaced from the portions 11, and inwardly extending portions 19 are secured to the disk 16 by a series of pins 20 the inner ends of which pass through the portions 19 of the rings 17 and the disk 16 and are provided with flanges 21.

Inner and outer parallel series of compressible, extensible and retractile elements, shown in the drawings as normally open spiral springs 22, are mounted on each side of the disk 16 and resiliently connect the felly and hub members of the wheel. The axes of the inner and outer series of springs are inclined, the axes of the springs of the inner series being inclined in the opposite direction to the axes of the adjacent springs of the outer series and crossing the axes of the adjacent springs of the outer series. The springs 22 are mounted by means of eyes on their ends, one eye of each spring engaging a circular groove in one of the pins 13 of the felly member 1 of the wheel and the other eye engaging a groove in one of the pins 20 of the hub member 2 of the wheel.

The working parts of the wheel are protected from injurious matter such as stones, dirt and water by means of coverings of flexible material, shown in the drawings as made of canvas, consisting of rings 23 having beads 24 and 25 on their edges formed by turning the edges of the rings over strips 26 of suitable material, shown in the drawings as made of ratan, and securing them in any suitable manner for instance by glue, cement or stitching. The coverings are left slack enough to allow for the movement between the hub and felly members of the wheel and are removably secured in place by rings 27 and 28 of suitable material, shown in the drawings as made of wood. The rings 27 are removably secured by a series of bolts 29 having nuts thereon and secure the inner edges of the covering rings by confining them against the portions 18 of the rings 17 and receiving the beads 24 into grooves 30 therein and confining them in the corners formed by the disk 16 and the rings 17. The rings 28 are interposed between the portions 5 and 11 and removably secured by a series of bolts 31 having nuts thereon and secure the outer edges of the covering rings 23 by confining them against the portions 11 of the rings 10 and receiving the beads 25 into grooves 32 therein and confining them in the corners formed by the rings 10 and 3.

By reason of the rings 3, 10 and 17 being angular the wheel is thereby rendered strong and rigid and by reason of the rings 28 being located between the portions 4, 5 and 11, the portions 5 are braced by the portions 4 and 11.

While the angle rings 5 of the felly member 1 of the wheel are shown in Figs. 1, 2 and 3 as provided with tire retaining flanges 6 angle rings 33 without tire retaining flanges, as shown in Fig. 4 of the drawings, may and preferably will be employed as the required resiliency of the wheel is supplied by the springs 22, however a cushion tire can be employed to prevent any noise which would otherwise be occasioned by contact of the metal portions of the wheel with the surface of the street or road.

Referring to the modifications shown by Fig. 5 of the drawings, this form of our invention only differs from that of the other figures in that normally closed spiral springs 34 are employed and applied under partial tension.

The operation of our invention as shown by Figs. 1 to 4 of the drawings is as follows: Upon weight being placed upon the hub member 2 of the wheel the disk 16 will be moved farther into the groove 9 of the felly member 1, extending some of the springs and compressing other of the springs in opposition to the springs being extended and when power is applied to the hub member of the wheel it will be rotated forwardly or rearwardly. If rotated forwardly both inner series of springs will be extended and both outer series of springs simultaneously compressed in opposition to the springs being extended, while if rotated rearwardly both outer series of springs will be extended and both inner series of springs simultaneously compressed in opposition to the springs being compressed. In either case whether the hub member of the wheel is rotated forwardly or rearwardly, by reason of the springs interposed between the hub and felly members, the hub member will rotate in advance of the felly member, thus gradually applying power to the driving wheel in either direction and reducing strain upon the driving shaft and the driving wheel and reducing the jar to the vehicle incident to starting in either direction or stopping.

The operation of the form of our invention shown by Fig. 5 is the same as that shown by the other figures except that in this instance the springs are not compressed.

We claim:

1. In a vehicle wheel, a hub member, a felly member, one of said members having a grooved portion and the other member having a projecting portion extending into and movable in said grooved portion, resilient means supporting one of said members movably in the other member, flexible coverings and means on said grooved and projecting portions of said members clamping the edges of said coverings against the grooved and projecting portions, substantially as described.

2. In a vehicle wheel, a hub member, a felly member, one of said members having a grooved portion and the other member having a projecting portion extending into and movable in said grooved portion, reinforcing means on opposite sides of said grooved and projecting portions, projections extending laterally from said members securing said reinforcing means in position and resilient means connecting said projections and supporting one member movably in the other member, substantially as described.

3. In a vehicle wheel, a hub member, a felly member, one of said members having a grooved portion and the other member having a projecting portion extending into and movable in said grooved portion, projections extending laterally from said members and having their outer ends free, resilient means connecting said projections and supporting one member movably in the other member and flexible coverings secured to each side of said members, substantially as described.

4. In a vehicle wheel, a hub member, a felly member, one of said members having a grooved portion and the other member having a projecting portion extending into and movable in said grooved portion, reinforcing rings on opposite sides of said grooved and projecting portions, projections extending laterally from said grooved and projecting portions on each side thereof securing said reinforcing means in position, and resilient means connecting said projections and supporting one member movably in the other member, substantially as described.

5. In a vehicle wheel, a hub member, a felly member, one of said members having a grooved portion and the other member having a projecting portion extending into and movable in said grooved portion, projections extending laterally from said grooved and projecting portions on each side thereof and having their outer ends free, resilient means connecting said projections and supporting one member movably in the other member and flexible coverings secured to each side of said members, substantially as described.

6. In a vehicle wheel, a hub member, a felly member, one of said members having a grooved portion and the other member having a projecting portion extending into and movable in said grooved portion, resilient means supporting one of said members movably in the other member, flexible coverings, and rings on said grooved and projecting portions of said members clamping the edges of said coverings against the grooved and projecting portions, substantially as described.

In testimony whereof, we have signed our names in the presence of two subscribing witnesses.

JOHN D. CAMPBELL.
ADOLPHUS J. MARTIN.

Witnesses:
 ROBERT P. JERROW,
 HARRY C. TOTAMS.

---

Copies of this patent may be obtained for five cents each, by addressing the "Commissioner of Patents, Washington, D. C."